Figures 1, 2:
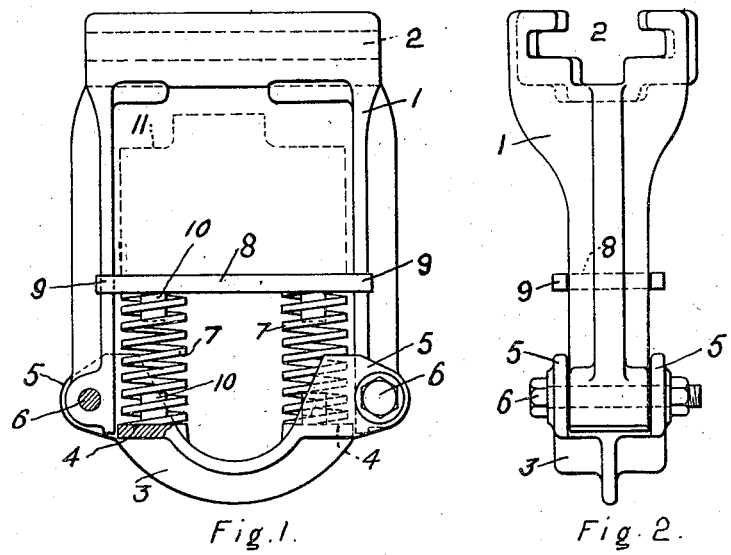

H. E. VAN DORN.
DRAW BAR CARRIER.
APPLICATION FILED JULY 16, 1915.

1,200,550.

Patented Oct. 10, 1916.

INVENTOR:
H. E. Van Dorn,
BY
Chamberlin Freudenreich
ATTORNEYS.

UNITED STATES PATENT OFFICE.

HERBERT E. VAN DORN, OF CHICAGO, ILLINOIS.

DRAW-BAR CARRIER.

1,200,550.  Specification of Letters Patent.  Patented Oct. 10, 1916.

Application filed July 16, 1915. Serial No. 40,147.

*To all whom it may concern:*

Be it known that I, HERBERT E. VAN DORN, a citizen of the United States, residing at Chicago, county of Cook, State of Illinois, have invented a certain new and useful Improvement in Draw-Bar Carriers, and declare the following to be a full, clear, and exact description of the same, such as will enable others skilled in the art to which it pertains to make and use the same, reference being had to the accompanying drawings, which form a part of this specification.

My invention has for its object to produce a simple and novel carrier for supporting at the front end or at an intermediate point a drawbar of the type which must be allowed considerable movements both in the lateral and in the vertical directions as, for example, the drawbars of street cars.

The various features of novelty whereby my invention is characterized will hereinafter be pointed out with particularity in the claim; but, for a full understanding of my invention and of its object and advantages, reference may be had to the following detailed description taken in connection with the accompanying drawing, wherein:

Figure 1 is a front elevation of a carrier arranged in accordance with one form of my invention, a fragment of the lower member being broken away and the drawbar being shown in dotted lines; and Fig. 2 is a side view of the device shown in Fig. 1.

Referring to the drawing, 1 represents a yoke in the form of an inverted U. In the top of the yoke is formed a suitably shaped groove, 2, adapted to permit the yoke to be hung upon the usual arc member on the under side of the car. The lower ends of the two arms of the yoke are connected together by a saddle, 3, provided with horizontal seats, 4, lying just inside of the lower ends of the two arms of the yoke, and with suitable ears or flanges, 5, extending upwardly and outwardly from the seats so as to embrace the lower ends of the arms of the yoke and form upwardly projecting walls in front of and behind the seats. Bolts, 6, passing through the ears 5 and the lower ends of the arms of the yoke fasten the saddle and the yoke securely together. On each of the two seats, between the adjacent flanges or walls, 5, is a helical spring, 7. Upon the two springs rests a supporting plate, 8, extending horizontally across the yoke from one arm to the other and provided at its ends with projections, 9, extending outwardly in front of and behind the arms so as to prevent displacement of the plate in a direction transverse to the plane of the yoke. At the middle of each seat and on the under side of each end of the plate 8 is a projection, 10, which extends centrally into the corresponding spring and aids in preventing displacement of the spring. The drawbar, indicated in dotted lines at 11, is adapted to rest on the supporting plate 8, the springs being strong enough to hold the drawbar normally at its normal elevation while permitting the drawbar to drop when necessary.

I claim:

A device of the character described comprising a yoke in the form of an inverted U, a saddle fitting between the lower ends of the arms of the yoke, springs resting on said saddle adjacent to said arms, and flanges on the ends of the saddle extending in front of and behind each spring and the corresponding arm of the yoke, bolts passing through each pair of flanges and the interposed arm, and a drawbar support resting upon said springs.

In testimony whereof, I sign this specification.

HERBERT E. VAN DORN.